United States Patent
Spraggs

(10) Patent No.: US 6,941,454 B1
(45) Date of Patent: Sep. 6, 2005

(54) SYSTEM AND METHOD OF SENDING AND RECEIVING SECURE DATA WITH A SHARED KEY

(76) Inventor: Lynn Spraggs, 8604 Kalavesta Dr., Vernon (CA)

( * ) Notice: Subject to any disclaimer, the term of this patent is extended or adjusted under 35 U.S.C. 154(b) by 0 days.

(21) Appl. No.: 09/554,419

(22) PCT Filed: Oct. 14, 1999

(86) PCT No.: PCT/US99/24142

§ 371 (c)(1),
(2), (4) Date: May 11, 2000

(87) PCT Pub. No.: WO00/22773

PCT Pub. Date: Apr. 20, 2000

Related U.S. Application Data

(60) Provisional application No. 60/104,270, filed on Oct. 14, 1998.

(51) Int. Cl.[7] ............................................... H04L 9/28
(52) U.S. Cl. .................................... 713/150; 380/282
(58) Field of Search ............................. 713/150, 159, 713/152, 200, 201; 380/259, 282; 705/64, 75, 27

(56) References Cited

U.S. PATENT DOCUMENTS

| | | | |
|---|---|---|---|
| 4,193,131 A | | 3/1980 | Lennon et al. .................. 375/2 |
| 5,148,479 A | | 9/1992 | Bird et al. ..................... 380/23 |
| 5,544,246 A | | 8/1996 | Mandelbaum et al. ......... 380/23 |
| 5,649,118 A | | 7/1997 | Carlisle et al. ............. 395/241 |
| 5,724,424 A | | 3/1998 | Gifford ........................ 380/24 |
| 5,812,671 A | * | 9/1998 | Ross, Jr. ..................... 713/153 |
| 5,970,475 A | * | 10/1999 | Barnes et al. ................. 705/27 |
| 6,061,790 A | * | 5/2000 | Bodnar ....................... 380/282 |
| 6,065,120 A | * | 5/2000 | Laursen et al. ............... 705/27 |
| 6,091,835 A | * | 7/2000 | Smithies et al. ............ 382/115 |

* cited by examiner

Primary Examiner—Matthew Smithers

(57) ABSTRACT

A server computer sends and receives secure data provided by authorized users. The data is secured by encrypting and decrypting the data with a key that is shared between the users and the server computer. As the server computer receives a user's encrypted data, the server computer decrypts the data using the user's shared key stored in a database on the server. The server computer can then process the data according to the user's instructions, this could include securely storing the data for retrieval by another user, processing the data, and/or securely sending the data to a second user by encrypting the data with the user's shared key.

33 Claims, 6 Drawing Sheets

SYSTEM AND METHOD OF SENDING AND RECEIVING SECURE DATA WITH A SHARED KEY

This application is a 371 of PCT/US99/24142 filed Oct. 14, 1999 which claims benefit of provisional No. 60/104,270 filed Oct 14, 1998.

BACKGROUND OF THE INVENTION

1. Field of the Invention

The present invention relates generally to computer security and more specifically to allow the secure transfer and receipt of data between computers.

2. Description of the Prior Art

In order to securely transfer data between computers on the Internet, various different types of encryption/decryption methods are used. One way of securely transferring data over the Internet includes the use of a public key/private key system.

A public key is provided by some designated authority as a key that, combined with a private key derived from the public key, can be used to effectively encrypt and decrypt messages and digital signatures.

In public key cryptography, a public and private key are created simultaneously using the same algorithm (a popular one is known as RSA) by a certificate authority. The private key is given only to the requesting party and the public key is made publicly available (as part of a digital certificate) in a directory that all parties can access. The private key is never shared with anyone or sent across the Internet. The private key is used to decrypt text that has been encrypted with the public key counterpart by someone else who has the public key.

Public key cryptography generally requires a large mathematical decomposition in order to work effectively. Generally, the length of a private key is in the order of 64 bytes. Decomposing these relatively small private keys requires considerable computational power. Public key cryptography is generally used as a one-way encryption and if a private key is changed, then everyone else that has the public key counterpart must receive a new public key.

Thus, it would be desirable to provide a system and method of securing data that is easy to use, does not require a public/private key, allows for a larger private key for more security, uses less computation power than public key cryptography, and can be used in two directions.

SUMMARY OF THE INVENTION

A system and method is provided for sending and receiving secure data. The data is secured by encrypting and decrypting the data with a key that is shared between authorized users and the server computer. As the server computer receives a user's encrypted data, the server computer decrypts the data using the user's shared key stored in a database on the server. The server computer can then process the data according to the user's instructions, this could include securely storing the data for retrieval by another user, processing the data, and/or securely sending the data to a second user by encrypting the data with the second user's shared key.

BRIEF DESCRIPTION OF THE DRAWINGS

The present invention may be better understood, and its numerous objects, features, and advantages made apparent to those skilled in the art by referencing the accompanying illustrations. For simplicity and ease of understanding, common numbering of elements is employed where an element is the same in different illustrations.

DETAILED DESCRIPTION OF THE INVENTION

The following is a detailed description of illustrative embodiments of the present invention. As these embodiments of the present invention are described with reference to the aforementioned illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Figure 1:
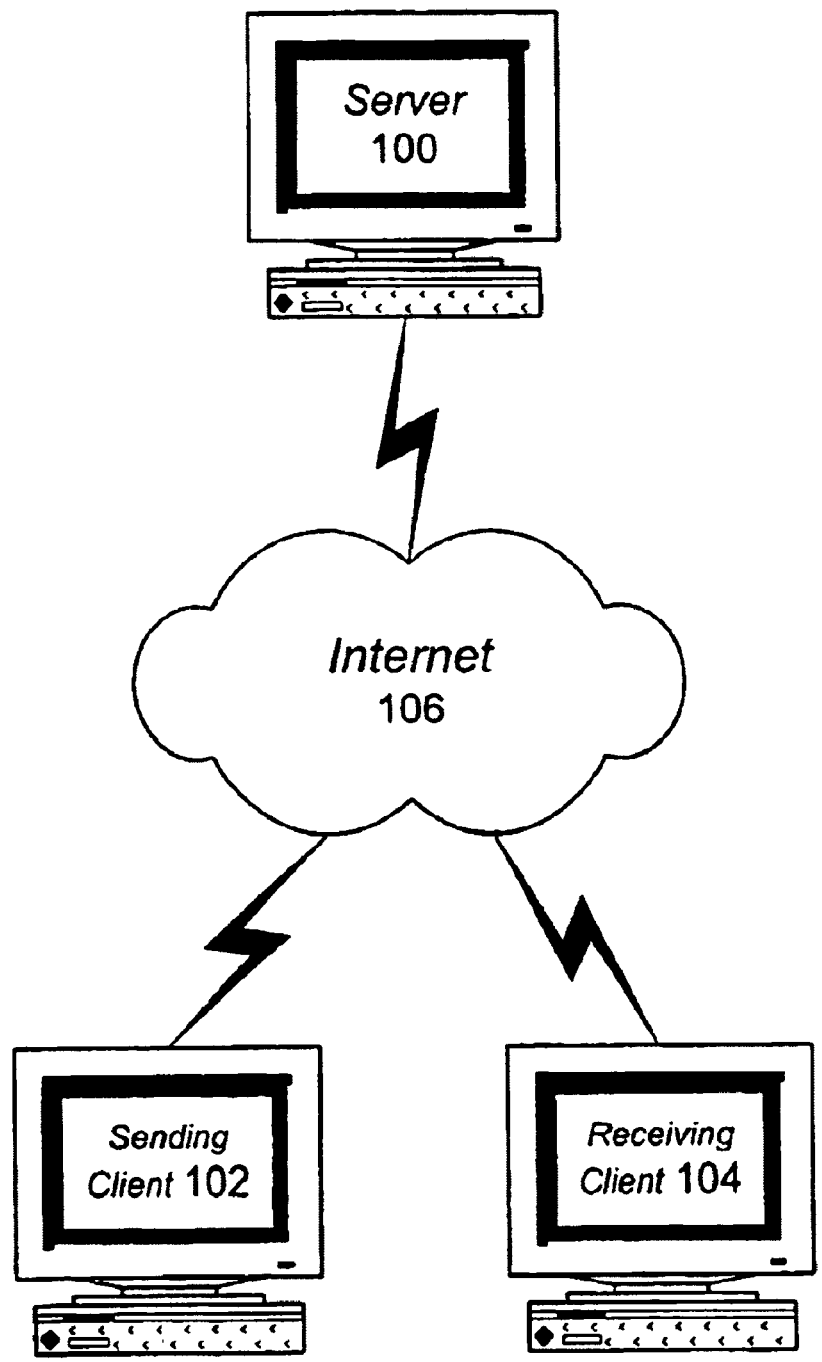
FIG. 1 is a schematic diagram illustrating a sending client transmitting secure data through a server to a receiving client over the Internet, in accordance with the present invention.

Referring now to FIG. 1, a schematic diagram illustrates a server 100 used to receive encrypted data from a sending client computer 102 and transmit encrypted data to a receiving client computer 104 through the Internet 106 using shared private keys. The sending client 102 and receiving client 104 share their own private key with the server 100, but do not share their private keys with anyone else.

Figure 2:
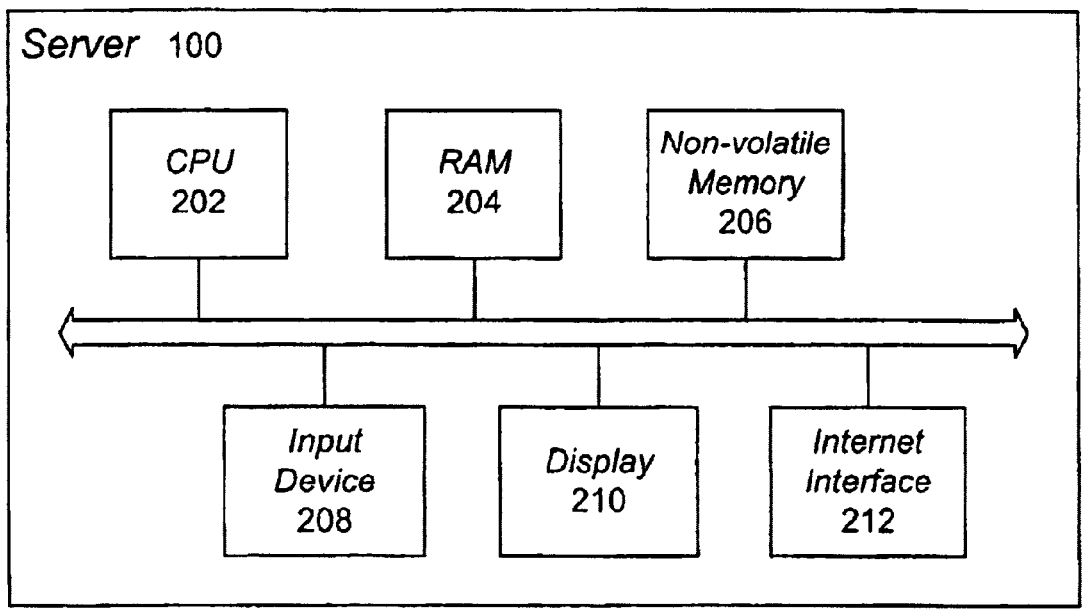
FIG. 2 is a block diagram of the server computer shown in FIG. 1, in accordance with the present invention.

FIG. 2 is a block diagram of the server computer 100 shown in FIG. 1. Server 100 includes a CPU 202, a RAM 204, a non-volatile memory 206, an input device 208, a display 210, and an Internet interface 212 for providing access to the Internet.

Figure 3:
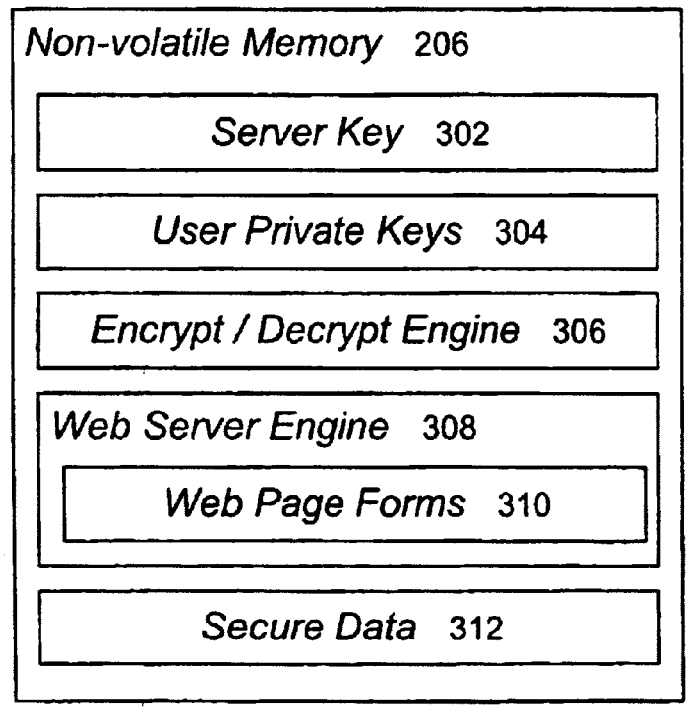
FIG. 3 is a block diagram of one embodiment of the non-volatile memory module located within the server computer of FIG. 2.

FIG. 3 is a block diagram of one embodiment of the non-volatile, memory module 206 located within the server computer 100 of FIG. 2. The non-volatile memory 206 includes a private server key 302, a database of user private keys 304, an encrypt/decrypt engine 306, a web server engine 308 containing web page forms 310, and a secure data database 312 for storing encrypted data. The private server key 302 is known only to the server and is not shared with anyone. The database of user private keys 304 includes the private keys of registered users. Each private key of a registered user is shared only with the server and not with other users.

The encrypt/decrypt engine 306 is programmed to encrypt and decrypt data using a password or a key. Excellent results can be obtained when using the blowfish algorithm for encryption and decryption. Other types of symmetric key encryption/decryption algorithms can also be employed within the encrypt/decrypt engine 306. The computation power required to encrypt and decrypt data using a single key is much less than the computational power required in a public/private key system, therefore longer keys can be used to provide an extremely high-level of security.

Figure 4:
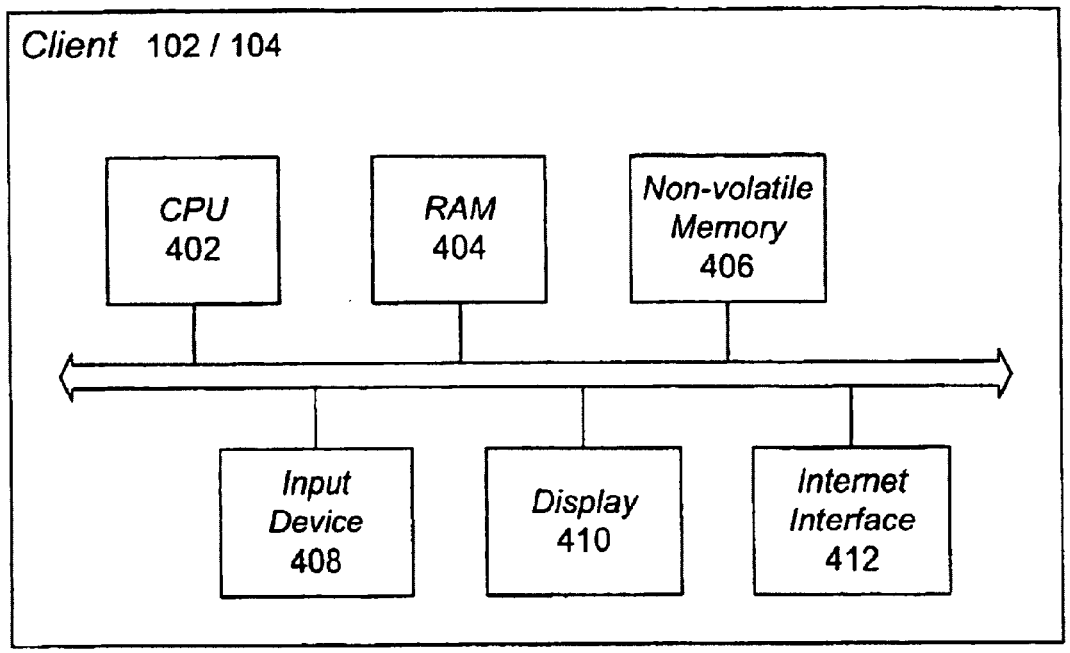
FIG. 4 is a block diagram of the client computers shown in FIG. 1, in accordance with the present invention.

FIG. 4 is a block diagram of a sending client computer 102 or a receiving client computer 104 shown in FIG. 1. Client 102, 104 includes a CPU 402, a RAM 404, a non-volatile memory 406, an input device 408, a display 410, and an Internet interface 412 for providing access to the Internet.

Figure 5:
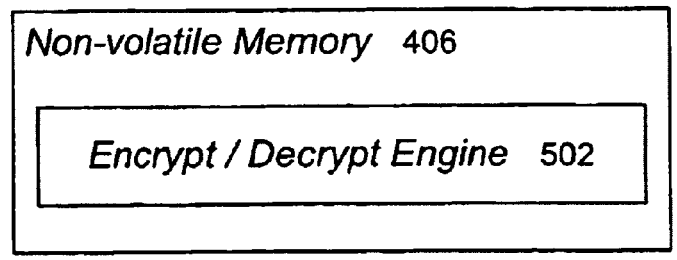
FIG. 5 is a block diagram of one embodiment of the non-volatile memory module located within the client computers of FIG. 4.

FIG. 5 is a block diagram of one embodiment of the non-volatile memory module 404 located within the clients 102, 104 of FIG. 4. The non-volatile memory 406 includes an encrypt/decrypt engine 502 for encrypting and decrypting data. The encrypt/decrypt engine 502 can also be stored in RAM 404. Excellent results can be obtained when the encrypt/decrypt engine is served up as a Java™ applet to the clients 102, 104. The Java™ applet can be served up with a web page. In another form, the encrypt/decrypt engine can be sent to the clients 102, 104, and then stored on their hard drive.

Figure 6:
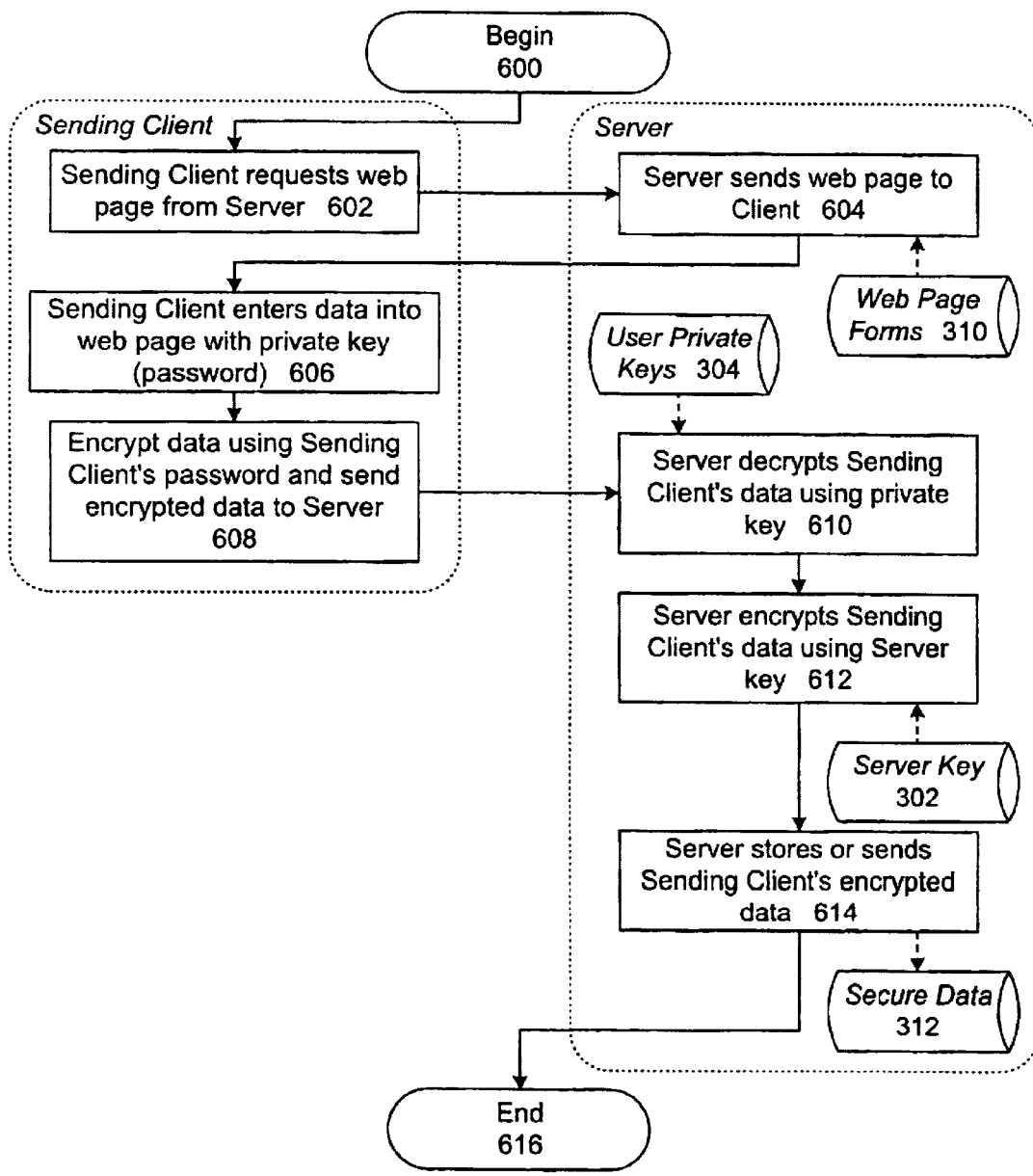
FIG. 6 is a flowchart of a method illustrating how a sending client, having a shared private key, passes encrypted data to a server computer, according to the invention.

FIG. 6 is a flowchart of a method illustrating how a sending client, with a shared private key, passes encrypted data to a server computer through the Internet in accordance with the invention. The process begins at step 600. The sending client establishes a session over the Internet with a suitable server by requesting a web page from the server computer at step 602. At step 604 the server sends a web page form from the web page forms database 310 to the sending client. Next at step 606 the sending client enters data into the web page along with the user's private key. At step 608 the data is encrypted with the encrypt/decrypt engine at the sending client's computer using the user's private key and then sent to the server.

At step 610 the server receives the sending client's data and decrypts the data with the user's private key that is stored in the user private keys database 304. Then at step 612 the server re-encrypts the data using the server key 302. At step 614 the server stores the re-encrypted data in the secure data database 312 and at step 616 the process ends.

Figure 7:
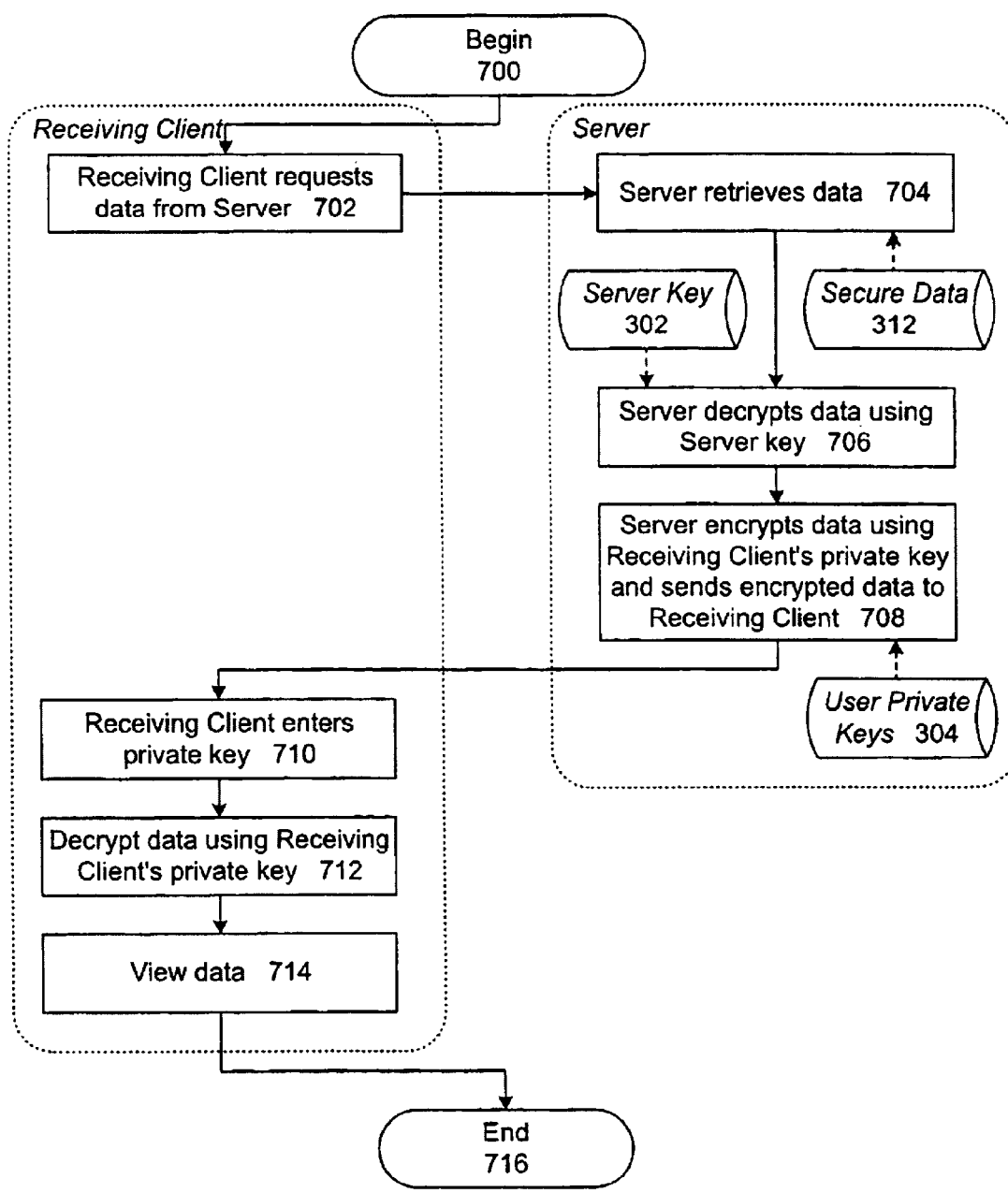
FIG. 7 is a flowchart of a method illustrating how a receiving client, having a shared private key, requests secure data from a server computer, in accordance with the invention.

FIG. 7 is a flowchart of a method illustrating how a receiving client, having a shared private key, accesses encrypted data from the server computer through the Internet in accordance with the invention. The process begins at step 700. The receiving client establishes a session over the Internet with a suitable server by requesting the encrypted data from the server computer at step 702. At step 704 the server retrieves the encrypted data from the secure data database 312. At step 706 the server decrypts the data using the server key 302. Then at step 708 the server encrypts the data using the receiving client's private key that is stored in the user private keys database 304, and sends the encrypted data to the receiving client.

At step 710, the receiving client enters his private key, and at step 712 the encrypted data is decrypted with the receiving client's private key using the encrypt/decrypt engine 502. At step 714 the receiving client can access or view the data, and at step 716 the process ends.

Figure 8:
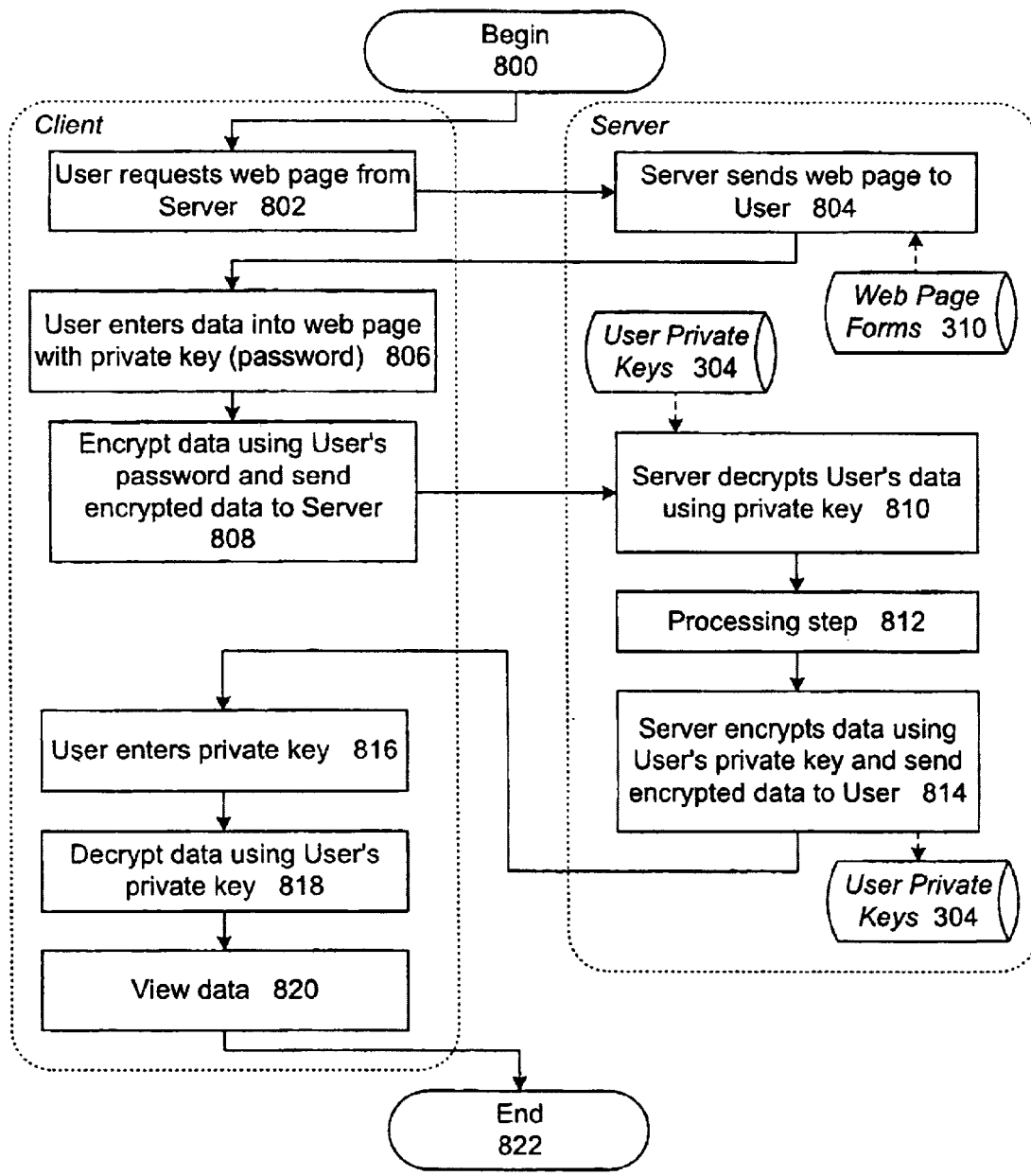
FIG. 8 is a flowchart of a method illustrating how a client, having a shared private key, passes secure data through a server computer.

FIG. 8 is a flowchart of a method illustrating how a user having a shared private key passes secure data through a server computer over the Internet. This method is very similar to the process described in FIGS. 6 and 7. The process begins at step 800. A user having a private key shared with the server establishes a session over the Internet with the server by requesting a web page at step 802 using a suitable client. At step 804 the server sends a web page form from the web page forms database 310 to the client. Next at step 806 the user enters data into the web page along with his private key shared with the server. At step 808 the data is encrypted with the encrypt/decrypt engine at the client computer using the user's private key and then the encrypted data is sent to the server. It is explicitly shown at step 808 that the user's private key is the user's personal authentication data. The encryption key is formed from the authentication data. Subsequently, the authentication data is NOT sent to the server and it is NOT used for authentication per se except in so far as both client and server are able to encrypt and decrypt the data using the same key.

At step 810 the server receives the sending client's data and decrypts the data with the user's private key that is stored in the user private keys database 304. Then at step 812 the server processes the data. This processing step can include many different types of applications including, but not limited to, storing data, calculating data, entering a stock transaction, verifying a credit card transaction, etc.

After the processing step is completed at step 814 the server encrypts the processed data using the user's private key that is stored in the user private keys database 304 and sends the encrypted data to the client. It is not necessary for the client to be the same client that began the process at step 802. The server can be used as an intermediary for passing and processing secure data between clients.

At step 816, the client receives the secure data and the user enters their private key. At step 818 the encrypted processed data is decrypted with the user's private key, which is now available to the client, using the encrypt/decrypt engine 502. At step 820 the client can access the data or the user can view the data, and at step 822 the process ends.

Various modifications can be made to the above described methods in order to provide a secure system and method of sending and receiving secure data with a shared key. This can be done in low-level and high-level security methods. For example, if a first user wanted to send a highly secure memo to a second person over the Internet using a screen-level encryption, the first user could write the memo at his computer, encrypt the memo and send it as an email through a server to the second user. The second user could then decrypt the email with his password and view the memo on his computer screen. The application used to decrypt and display the memo on the computer screen can be programmed so that the memo cannot ever be in a decrypted state in any file on the computer, including temporary files, but only programmed to display the decrypted memo on a computer screen. The application could be resident on the user's computer, or it can be deployed as a Java™ applet.

I claim:

1. A system for using a shared key to transmit secure data between a client and a server, the system comprising:

an encrypt/decrypt engine for using the shared key to encrypt or decrypt data, the encrypt/decrypt engine being configured for delivery via a web page to a client in response to a user request and further configured to encrypt data independently of an identity of the physical client;

wherein the server includes a user private keys database configured to store the shared key, and wherein, it is possible for the client and the server to reside on the same physical computing device, and where the shared key is derived from the user's authentication data, and the derived shared key is used for encrypting all data.

2. The system of claim 1 wherein the shared key is a user's private key entered by a user into the web page.

3. The system of claim 1 further comprising a secure data database configured to store data received from the client and, upon the completion of a processing step, to deliver the stored data in an encrypted format to the client or to another client.

4. The system of claim 1 further comprising a secure data database configured to store data received from the client and, upon receipt of a request for the data, to deliver the stored data in an encrypted format to the client or to another client.

5. The system of claim 1 wherein the shared key is transmitted between the server and the client as few as zero times and the shared key is transmitted between the server and the user as few as one time, the key is not sent for authentication purposes, rather, the effect of the key in the encryption process is sent, consequently, the shared key does not need to be retransmitted once it has been established.

6. The system of claim 1 wherein the shared key is a user's private key entered by a user.

7. The system of claim 1 wherein the client encrypt/decrypt engine is installed on the client.

8. A system for using a shared key in transmitting secure data between a client and a server, the system comprising:

an encrypt/decrypt engine for using, the shared key, in encrypting data, the encrypt/decrypt engine being configured to encrypt data independently of an identity of the client;

and a user private keys database located on the server and configured to store the shared key, the shared key being the private key of a user, and where the shared key is derived from the user's authentication data, and the derived shared key is used for encrypting all data.

9. The system of claim 8 wherein the server is configured to decrypt encrypted data received from the client using the shared key and to use a private server key, known only by the server, to re-encrypt the decrypted data.

10. The system of claim 9 further comprising a secure data database configured to store the encrypted data received from the client and re-encrypted by the server and to deliver the stored data to the client or to another client; the delivered data, after the completion of a processing step, being encrypted with the shared user key or with another shared user key, and where the shared key is derived from the user's authentication data, and the derived shared key is used for encrypting all data.

11. The system of claim 9 further comprising a secure data database configured to store the encrypted data received from the client and re-encrypted by the server and to deliver the stored data to the client or to another client; the delivered data being, upon receipt of a request for the data, encrypted with the shared user key or with another shared user key, where the shared key is derived from the user's authentication data, and the derived shared key is used for encrypting all data.

12. The system of claim 11 wherein the request is from the user.

13. The system of claim 11 wherein the request is from an other user.

14. A system for using a shared key in transmitting secure data between a client and a server, the system comprising:

an encrypt/decrypt engine for using the shared key entered by a user to encrypt data entered by the user, the encrypt/decrypt engine being configured such that all data entered by the user and stored on the client is stored in encrypted form, and further configured to encrypt data independently of an identity of the physical client; the shared key entry being the responsibility of the user and not the client; the server including a user private keys database configured to store the shared key, the shared key being a private key of a user; and not a physical client and, where the shared key is derived from the user's authentication data and the derived shared key is used for encrypting all data.

15. The system of claim 14, wherein the encrypt/decrypt engine uses a symmetric key encryption/decryption algorithm for encrypting and decrypting data.

16. The system of claim 14, further including a web server engine configured for the user to securely send or receive data from the client to the server.

17. A method for using a shared key in receiving secure data on a server, comprising the steps of:

delivering from a server to a client a web page including an encrypt/decrypt engine; encrypting data on the client using the encrypt/decrypt engine and a shared key entered by a user of the client, the shared key being shared between the user aid the server; delivering the encrypted data from the client to the server; where the shared key is derived from the user's authentication data and the derived shared key is used for encrypting all data; receiving the encrypted data at the server; decrypting the encrypted data at the server using the shared key; and processing the decrypted data, where the shared key is derived from the user's authentication data and the derived shared key is used for encrypting all data.

18. The method of claim 17, wherein the step of processing the decrypted data includes the steps of: encrypting the decrypted data with a private server key; and storing the encrypted data in a database.

19. The method of claim 17, wherein the step of processing the decrypted data includes the steps of: re-encrypting the data with an other user's private key shared between the other user and the server; and sending the re-encrypted data to the other user.

20. The method of claim 17, wherein the step of processing the decrypted data includes the steps of: decrypting the encrypted data with the private server key; re-encrypting the data with a second user's key shared between the second user and the server; and sending the re-encrypted data to the second user.

21. The method of claim 17, wherein the step of processing the decrypted data includes the steps of: processing the data according to an instruction of the user; re-encrypting the processed data using the user's shared key; and sending the re-encrypted processed data to the user.

22. The method of claim 17, wherein the step of, processing the decrypted data includes storing the decrypted data in a secure database.

23. A computer-readable medium comprising program instructions for causing a computer system to use a shared key in receiving secure data at a server, by the steps of:

delivering a web page from the server to a client, the web page including an encrypt/decrypt engine and being configured to use the encrypt/decrypt engine and a shared key entered by a user of the client to encrypt data on the client; the shared key being shared between the user and the server; receiving the encrypted data at then server; decrypting the encrypted data using the shared key; and processing the decrypted data where the shared key is derived from the user's authentication data and the derived shared key is used for encrypting all data.

24. A computer-readable medium comprising program instructions for causing a computer system to receive secure data on a server using a shared key, by the steps of: delivering an encrypt/decrypt engine from the server to a client, the encrypt/decrypt engine being configured to use a shared key entered by a user of the client to encrypt data on the client, the shared key being shared between the user and the server and the encryption being independent of an identity of the physical client; receiving the encrypted data at the server; decrypting the encrypted data using the shared key; and processing the decrypted data, where the shared key is derived from the user's authentication data and the derived shared key is used for encrypting all data.

25. The computer readable medium of claim 24, further comprising program instructions for causing the processed decrypted data to be re-encrypted using a private server key.

26. The computer-readable medium of claim 25, further comprising program instructions for causing the processed decrypted data to be stored in a secure database.

27. The computer-readable medium of claim 24, wherein processing the decrypted data includes the steps of: re-encrypting the data with the private server key; storing the re-encrypted data; decrypting the stored data with the private server key; encrypting the data with a second user's key shaved between the second user and the server; and sending the encrypted data to the second user.

28. The computer-readable medium of claim 24 wherein processing the decrypted data includes the steps of: processing the data according to an instruction of the user; encrypting the processed data using a shared key; and sending the encrypted processed data to the user or to another user.

29. A method of using a shared key in transmitting secure data between a client and a server using a shared key, comprising the steps of: encrypting data using the shared key with an encrypt/decrypt engine configured to encrypt data independently of an identity of the client, the shared key being entered by a user of the client; delivering the encrypted data from the client to the server; receiving the encrypted data at the server; decrypting the encrypted data, at the server using the shared key, the shared key being stored in a user private keys database; and processing the decrypted data, where the shared key is derived from the user's authentication data and the derived shared key is used for encrypting all data.

30. The method of claim 29, wherein processing the decrypted data includes the steps of: encrypting the decrypted data with a private server key; and storing the encrypted data, in a database.

31. The method of claim 29, wherein the step of processing the decrypted data includes the steps of: encrypting the data with an other user's private key shared between the other user and the server; and sending the encrypted data to the other user.

32. The method of claim 29, wherein the step of processing the decrypted data includes the steps of: decrypting the re-encrypted data with the private server key; encrypting the data with a second user's key shared between the second user and the server; and sending the encrypted data to the second user.

33. The method of claim 29, wherein the step of processing the decrypted data includes the steps of: processing the data according to an instruction of the user; re-encrypting the processed data using the user's shared key; and sending the re-encrypted processed data to the user.

* * * * *